US008649925B2

(12) United States Patent
Light et al.

(10) Patent No.: US 8,649,925 B2
(45) Date of Patent: Feb. 11, 2014

(54) METHOD AND SYSTEM FOR CONTROLLING OPERATION OF AN ELECTRIC OIL PUMP IN A HYBRID ELECTRIC VEHICLE (HEV)

(75) Inventors: Brian Richard Light, Flat Rock, MI (US); Shailesh Shrikant Kozarekar, Novi, MI (US); Wei Wu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 12/870,924

(22) Filed: Aug. 30, 2010

(65) Prior Publication Data

US 2011/0166727 A1 Jul. 7, 2011

(51) Int. Cl.
*B60L 9/00* (2006.01)
*B60K 1/00* (2006.01)

(52) U.S. Cl.
USPC .............................................. 701/22; 180/65

(58) Field of Classification Search
USPC .......................................................... 701/22
See application file for complete search history.

(56) References Cited

U.S. PATENT DOCUMENTS

| | | | |
|---|---|---|---|
| 5,217,085 A | 6/1993 | Barrie et al. | |
| 5,343,970 A * | 9/1994 | Severinsky | 180/65.25 |
| 5,842,534 A * | 12/1998 | Frank | 180/65.25 |
| 6,513,609 B2 | 2/2003 | Hasegawa | |
| 6,607,142 B1 | 8/2003 | Boggs et al. | |
| 6,769,502 B2 | 8/2004 | Nakamori et al. | |
| 6,805,647 B2 | 10/2004 | Silveri et al. | |
| 6,817,964 B2 | 11/2004 | Kayukawa et al. | |
| 6,830,116 B2 | 12/2004 | Ishimaru et al. | |
| 6,913,558 B2 | 7/2005 | Mori et al. | |
| 6,964,631 B2 | 11/2005 | Moses et al. | |
| 7,316,283 B2 * | 1/2008 | Yamamoto et al. | 180/65.235 |
| 7,395,803 B2 | 7/2008 | Ledger et al. | |
| 7,637,336 B2 | 12/2009 | Enomoto et al. | |
| 8,155,848 B2 * | 4/2012 | Kobayashi et al. | 701/66 |
| 8,251,034 B2 * | 8/2012 | Hashim | 123/179.3 |
| 2004/0045749 A1 | 3/2004 | Jaura et al. | |
| 2007/0098567 A1 | 5/2007 | Johnson et al. | |
| 2009/0236159 A1 * | 9/2009 | Shibata et al. | 180/65.235 |
| 2010/0102767 A1 | 4/2010 | Endo et al. | |
| 2011/0135499 A1 * | 6/2011 | Lee et al. | 417/44.1 |

FOREIGN PATENT DOCUMENTS

| | | |
|---|---|---|
| JP | 2003065102 A | 3/2003 |
| JP | 2006226440 A | 8/2006 |
| JP | 2006254616 A | 9/2006 |
| JP | 2008114844 A | 5/2008 |

(Continued)

OTHER PUBLICATIONS

Bly, Micky, Hybrid Technologies Challenge Bibendum HEV Round Table, General Motors, Nov. 2007, pp. 1-22.

(Continued)

*Primary Examiner* — Garcia Ade
(74) *Attorney, Agent, or Firm* — David B. Kelley; Brooks Kushman P.C.

(57) ABSTRACT

A system and method is provided for controlling operation of an electric oil pump in a hybrid electric vehicle (HEV). The HEV includes an engine and a transaxle including an electric motor coupled to a traction battery. A commanded speed for the electric oil pump is determined and whether the engine in the HEV is in an off state is determined. When the engine is in the off state, the electric oil pump is controlled to operate at the commanded speed.

10 Claims, 3 Drawing Sheets

(56) References Cited

FOREIGN PATENT DOCUMENTS

| JP | 2008278557 A | 11/2008 |
|----|--------------|---------|
| JP | 2009115186 A | 5/2009 |
| KR | 20080033697 A | 4/2008 |

OTHER PUBLICATIONS

Husted, Harry L., A Comparative Study of the Production Applications of Hybrid Electric Powertrains, SAE Technical Paper Series 2003-01-2307, Future Transportation Technology Conference, Jun. 23-25, 2003, Costa Mesa, California, pp. 1-14.

* cited by examiner

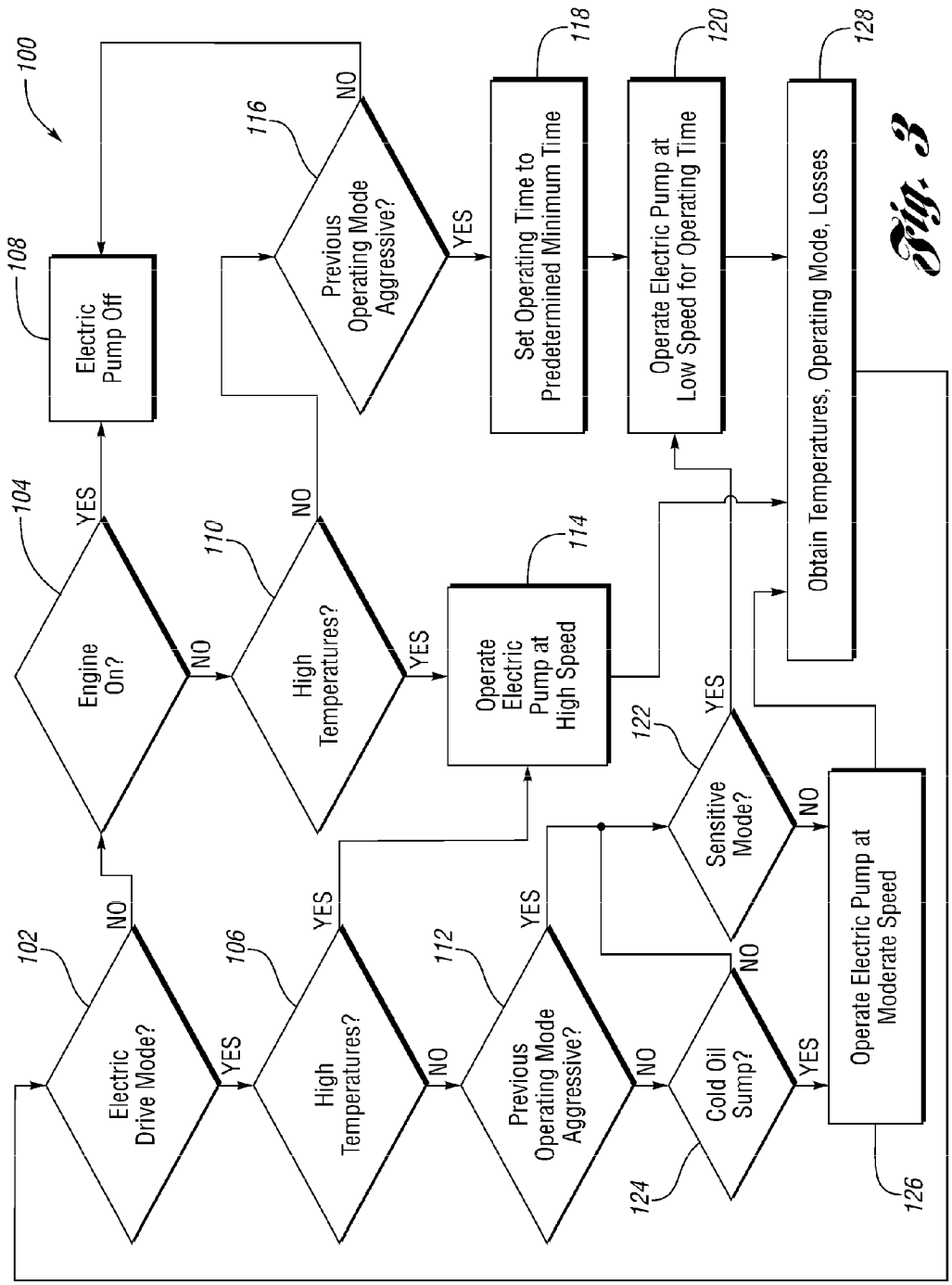

METHOD AND SYSTEM FOR CONTROLLING OPERATION OF AN ELECTRIC OIL PUMP IN A HYBRID ELECTRIC VEHICLE (HEV)

BACKGROUND

1. Technical Field

Controlling electric oil pumps in hybrid vehicles.

2. Background Art

A hybrid electric vehicle (HEV) typically includes an engine, such as an internal combustion engine (ICE), and an electric motor. For example, the HEV may be a series hybrid electric vehicle (SHEV), a parallel hybrid electrical vehicle (PHEV), or a parallel/series hybrid electric vehicle (PSHEV).

The series hybrid electric vehicle (SHEV) is a vehicle with an engine (most typically an ICE) connected to an electric machine, which provides electric power to a battery. Another electric machine called a traction motor is powered by the battery. The traction motor in the SHEV is the sole source of wheel torque. There is no mechanical connection between the engine and the drive wheels.

The parallel hybrid electrical vehicle (PHEV) has an engine (most typically an ICE) and an electric motor that work together to provide traction wheel torque to drive the vehicle. In addition, the motor in the PHEV can be used as a generator to recover regenerative power to charge the battery.

The parallel/series hybrid electric vehicle (PSHEV) has characteristics of both PHEV and SHEV configurations and is sometimes referred to as a "split" parallel/series configuration. In one of several types of PSHEV configurations, the engine is mechanically coupled to two electric machines in a planetary gear-set transaxle. A first electric machine, the generator, is connected to a sun gear. The engine is connected to a planetary carrier. A second electric motor, a traction motor, is connected to a ring (output) gear via additional gearing in a transaxle. Engine torque can power the generator to charge the battery. The generator can also contribute to the necessary wheel (output shaft) torque. The traction motor is used to contribute wheel torque and to recover regenerative braking energy to charge the battery. In this configuration, the generator can selectively provide a reaction torque that may be used to control engine speed.

During operation of a HEV, heat is generated and lubrication is needed for various components in the HEV. Thus, an engine-driven transaxle pump may be provided to cool and lubricate the various power transmission components in the HEV. However, when the HEV is being electrically operated, the engine is off and therefore the engine-driven transaxle pump is not operational. Therefore, an auxiliary electric pump may be implemented for purposes such as meeting the cooling and lubrication needs of the HEV when the engine is off.

SUMMARY

A system and method is provided for controlling operation of an electric oil pump in a hybrid electric vehicle (HEV). The HEV includes an engine and a transaxle with an electric motor. When the engine is in an off state, the electric oil pump is controlled to operate at a commanded speed.

BRIEF DESCRIPTION OF THE DRAWINGS

FIG. 3 is a flowchart diagram illustrating a method of controlling operation of the electric oil pump in the HEV in accordance with another embodiment.

DETAILED DESCRIPTION

Embodiments of the present disclosure include a method and system for controlling operation of an electric oil pump in a hybrid electric vehicle (HEV). The vehicle may be any type of HEV that includes an electric oil pump to provide transaxle lubrication. The vehicle may be, for example, a parallel/series hybrid electric vehicle (PSHEV), a plug-in hybrid electric vehicle, a hybrid fuel cell electric vehicle (FCEV), or battery-replacement electric vehicle.

Figure 1:
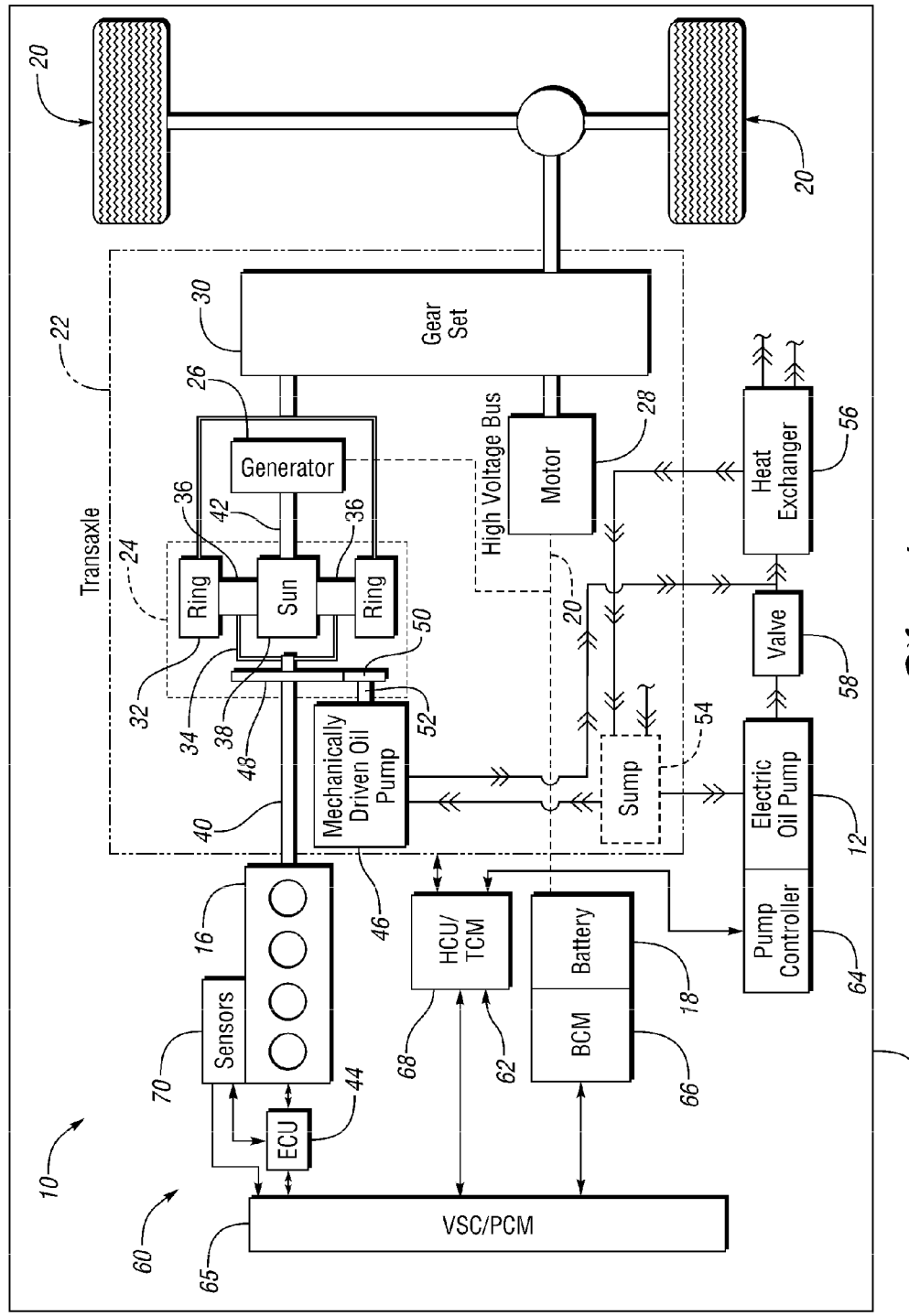
FIG. 1 is a schematic diagram illustrating a hybrid electric vehicle (HEV) including an electric oil pump as well as a system for controlling operation of the electric oil pump in accordance with one embodiment.

With reference to FIG. 1, a system 10 is provided for controlling operation of an electric oil pump 12 in a hybrid electric vehicle (HEV) 14. The system 10 of FIG. 1 is shown integrated with a powertrain of a parallel/series hybrid electric vehicle (PSHEV). However, the system 10 may be integrated with other powertrain configurations, as indicated above, such as a series hybrid electric vehicle (SHEV) or a parallel hybrid electric vehicle (PHEV). The system 10 and its method of operation are described in a general fashion to facilitate understanding of various aspects of the system 10 and method.

As illustrated in FIG. 1, the HEV 14 includes an engine 16, a storage battery 18 (hereinafter "battery"), and drive wheels 20. The engine 16 and the battery 18 selectively provide power to the drive wheels 20 so that the HEV 14 can be propelled. The engine 16 of FIG. 1 is shown as an internal combustion engine (ICE) that consumes gasoline, diesel, or other combustible fuel to power the engine 16.

As shown in FIG. 1, the HEV 14 includes a transaxle 22, which is analogous to a transmission in a conventional automotive vehicle. The transaxle 22 includes a power-split gearing 24, an electric generator 26, an electric motor 28, and a power transfer gear set 30. The transaxle 22 is disposed between the drive wheels 20 and the engine 16 to effect power transfer to the drive wheels 20. The electric motor 28 and the electric generator 26 are two electric machines that make up an electric machine arrangement.

As depicted in FIG. 1, the power-split gearing 24 of the transaxle 22 mechanically connects the engine 16 and the electric generator 26. The power-split gearing 24 may be a planetary gear set having a ring gear 32, a carrier 34, planet gears 36, and a sun gear 38. An engine drive shaft 40 drivably connects the engine 16 and the carrier 34. A generator drive shaft 42 mechanically connects the electric generator 26 and the sun gear 38. Alternatively, the power-split gearing 24 may include other types of gear sets and transmissions for coupling the engine 16 and the electric generator 26.

In operation, the power-split gearing 24, the electric generator 26 and the electric motor 28 generate heat and may need to be cooled. As lubrication levels for the power-split gearing 24, the electric generator 26, and/or the electric motor 28 decrease, power losses in the transaxle 22 increase and additional lubrication may be needed for the transaxle 22. The power loss between the electric motor 28 and the electric generator 26 may be referred to as "$P_{loss}$." $P_{loss}$ can be determined empirically for different speeds and torques of the electric motor 28 and the electric generator 26.

The battery 18 of FIG. 1 outputs or stores electrical power when operating together with the electric motor 28 and the electric generator 26. For example, the battery 18 may be a high voltage battery that outputs high-voltage electric power to a high voltage bus as shown in FIG. 1. One or more DC-to-AC power converters (not shown) may convert DC electrical power from the battery 18 to AC power that is suitable for driving the electric motor 28. Furthermore, one or more DC-to-DC power converters may convert the DC electrical power from the battery 18 to DC voltage power that is suitable to drive the electric generator 26. The electric power that the battery 18 outputs may be referenced as "$P_{batt}$". In addition, the HEV 14 may redistribute power between the engine 16 and the battery 18. For example, the battery 18 can store power generated by the engine 16 in excess of power commanded.

As depicted in FIG. 1, the HEV 14 includes an engine control unit 44 (ECU). The ECU 44 may include an electronic engine throttle control (ETC) system. In operation, the ECU 44 controls the engine 16 and the engine 16 outputs torque to the engine drive shaft 40 connected to the power-split gearing 24. The power-split gearing 24 receives power from the engine 16 through the engine drive shaft 40 and transfers the power either to the drive wheels 20 through power transfer gear set 30 of the transaxle 22 or to the electric generator 26. In addition to receiving power from the engine 16, the power-split gearing 24 can also receive power from the electric generator 26.

Referring to FIG. 1, the electric generator 26 can be used as either an electric motor, or a machine that converts mechanical energy into electrical energy, or both. Operating as an electric motor, the electric generator 26 outputs torque to generator drive shaft 42 connected to the power-split gearing 24, which can transfer torque to ring gear 32 to the torque input side of gear set 30. Because the sun gear 38 acts as a torque reaction element, the electric generator 26 can control the speed of the engine 16. Operating as a machine that converts mechanical energy into electrical energy, the electric generator 26 outputs electrical power to the high voltage bus. The high voltage bus receives the electrical power from the electric generator 26. One or more DC-to-AC power converters (not shown) may convert the DC electrical power from the electric generator 26 to AC power that is suitable for driving the multi-phase induction electric motor 28. Furthermore, one or more AC-to-DC power converters may convert the AC electrical power from the electric generator 26 to DC voltage power that is suitable to charge the battery 18.

As shown in FIG. 1, the HEV 14 includes an mechanically-driven oil pump 46. The mechanically-driven oil pump 46 pumps transaxle oil for cooling and lubrication of the transaxle 22. As shown, the HEV 14 may include a pump drive gear 48, a hydraulic pump driven gear 50, and a pump drive shaft 52 to transfer torque from the engine drive shaft 40 to the mechanically-driven oil pump 46. In operation, the engine 16 rotates the engine drive shaft 40 and the engine drive shaft 40 rotates the pump drive gear 48. The gears 48 and 50 mesh so that rotation of the pump drive gear 48 rotates the hydraulic pump driven gear 50 and the pump drive shaft 52. Thus, the mechanically-driven oil pump 46 is driven when the engine 16 outputs torque to the engine drive shaft 40.

As shown in FIG. 1, the electric oil pump 12 pumps transaxle oil or other fluid lubricant for cooling and lubrication of the transaxle 22. Operation of the electric oil pump 12 can be controlled to provide varying levels or rates of transaxle lubrication in the HEV 14. It may be desirable or necessary that the transaxle 22 in the HEV 14 have sufficient lubrication before torque is applied to the transaxle 22. Operation of the electric oil pump 12 can be controlled to provide different rates of cooling the transaxle 22 in the HEV 14. While the electric oil pump 12 is shown separate from the transaxle 22 in FIG. 1, the electric oil pump 12 may part of the transaxle 22 depending on the configuration of the HEV 14.

As shown in FIG. 1, the HEV 14 includes a sump 54. The sump 54 stores the transaxle oil or other fluid lubricant for the transaxle 22. In operation, the electric oil pump 12 and the mechanically-driven oil pump 46 obtain the transaxle oil or other fluid lubricant from the sump 54 and transfer it to various components in the transaxle 22. While the sump 54 is shown as part of the transaxle 22 in FIG. 1, the sump 54 may separate from the transaxle 22 depending on the configuration of the HEV 14.

As shown in FIG. 1, the HEV 14 may include a heat exchanger 56. The heat exchanger 56 can either add or remove heat to transaxle oil in the HEV 14. For example, the heat exchanger 56 may be an oil-to-air heat exchanger. The oil-to-air heat exchanger transfers heat from transaxle oil flowing through the heat exchanger 56 to air flowing through the heat exchanger 56. Furthermore, the oil-to-air heat exchanger may receive heat from air flowing through the heat exchanger 56 and add the heat to the transaxle oil flowing through the heat exchanger 56.

As shown in FIG. 1, the HEV 14 may include a check valve 58 between the heat exchanger 56 and the electric oil pump 12. The check valve 58 prevents flow through the electric oil pump 12 circuit when the mechanically-driven oil pump 46 is operating or if the lube/cooling circuit is pressurized.

During operation, the mechanically-driven oil pump 46 and the electric oil pump 12 circulate transaxle oil from the sump 54, through fluid paths (shown in FIG. 1), and to various transaxle components in the HEV 14. Furthermore, once the transaxle oil leaves the heat exchanger 56, the transaxle oil is circulated throughout the transaxle 22 to lubricate and cool various transaxle components in the HEV 14. Transaxle components in the HEV 14 may include the power-split gearing 24 as well as other powertrain elements in the HEV 14, such as the electric motor 28 and the electric generator 26. For example, the transaxle oil can conduct heat from a rotor or stator windings of the motor 28 to cool the motor 28. In another example, the mechanically-driven oil pump 46 may distribute the transaxle oil to the transaxle 22 to prevent damage or degradation to the transaxle 22 when the power-split gearing 24 is transferring torque or power from the engine 16 through shafts 40 and 42.

With continuing reference to FIG. 1, the system 10 includes a logic device (LD) or controller 60. The controller or LD 60 can be implemented by various types or combinations of electronic devices and/or microprocessor-based computers or controllers. To implement a method of controlling operation of the electric oil pump 12, the controller 60 may execute a computer program or algorithm embedded or encoded with the method and stored in volatile and/or persistent memory. Alternatively, logic may be encoded in a logic or gate array stored on one or more integrated circuit chips. In one example, the memory may be computer-readable memory that stores the computer program or algorithm embedded or encoded with the method. The memory may store data or information about the various operating conditions or components in the HEV 14, such as the engine 16 and the transaxle 22. For example, the memory may store torque and speed data of the electric motor 28, the electric generator 26, or both the electric motor 28 and the electric generator 26. In addition, the memory may store a predetermined speed threshold for the engine 16, a predetermined idle speed of the electric oil pump 12, a predetermined minimum time for operating the electric oil pump 12, as well as a predetermined threshold temperature for transaxle oil in the HEV 14. The memory 34 can be part of the controller 60. However, the memory 34 may be positioned in any suitable location in the HEV 14 accessible by the controller 60.

The LD or controller 60 for controlling operation of the electric oil pump 12 is shown as combination of a hybrid control unit (HCU) 62 and a pump controller 64. The combination of the HCU 62 and the pump controller 64 is hereinafter referenced as a "controller" having reference numeral 60. Although the controller or LD 60 may include multiple controllers in the form of multiple hardware devices, or multiple software controllers within one or more hardware devices, the LD or controller 60 may also be a single hardware device to control operation of the electric oil pump 12. Furthermore, the controller 60 may include additional hardware devices or software controllers, such as a vehicle system controller (VSC), a powertrain control module (PCM), the ECU 44, or a combination thereof depending on the configuration of the system 10. The VSC and the PCM of FIG. 1 are shown combined into a single device and are hereinafter referenced as a "VSC/PCM" having reference numeral 65.

The VSC/PCM 65 can control the transaxle 22, the engine 16, and the battery 18 either directly or through separate controllers that function under supervisory control of the VSC/PCM 65. For example, the VSC/PCM 65 may communicate with the ECU 44 to control the engine 16. Similarly, the VSC/PCM 65 may communicate with a battery control module (BCM) 66 to control the battery 18. The BCM 66 transmits and receives signals to and from the VSC/PCM 65 and the battery 18. In another example, the VSC/PCM 65 may communicate with the hybrid control unit (HCU) 62 to control the transaxle 22. In such an example, the HCU 62 may include one or more controllers of the transaxle 22, such as a transaxle control module (TCM) 68. The controller 60 may include the TCM 68 depending on the configuration of the system 10. The TCM 68 is configured to control specific components within the transaxle 22, such as the electric generator 26 and the electric motor 28. In addition, the TCM 68 may provide data or information for the controller 60 to control the electric oil pump 12.

The VSC/PCM 65 and the TCM 68 operate to control the various modes of the transaxle 22, such as operation of an electric drive mode of the HEV 14. The electric drive mode of the HEV 14 allows the electric motor 28 to operate as a motor, as a generator, or as both to provide electric power to operate the HEV 14. For example, electric drive mode of the HEV 14 can be used to drive the drive wheels 20 and propel the HEV 14.

The VSC/PCM 65 and the TCM 68 may store information about previous operating modes of the HEV 14, such as previous drive-cycle data of the HEV 14. The various modes of the transaxle 22 can be communicated to the controller 60 via the TCM 68 or directly to the controller 60 via signals that the transaxle 22 provides to the HCU 62. For example, the controller 60 may obtain data or information including the speed of the engine 16, motor speed $\omega_{mot}$, motor torque $\tau_{mot}$, generator speed $\omega_{gen}$, generator torque $\tau_{gen}$, battery power $P_{batt}$, and motor and generator power loss $P_{loss}$. The VSC/PCM 65 may communicate with the BCM 66, the ECU 44, the TCM 68, or a combination thereof to provide such data or information to the controller 60. Alternatively, the controller 60 may calculate such data or information based on various input signals from the VSC/PCM 65, the BCM 66, the ECU 44, the TCM 68, or a combination thereof.

As shown in FIG. 1, the HEV 14 may include one or more sensors 70. The sensors 70 may be disposed near the engine 16 to sense various parameters of the engine 16. The sensors 70 provide engine operating data to the ECU 44 and/or the VSC/PCM 65. As shown in FIG. 1, the VSC/PCM 65, either alone or in combination with other elements of the controller 60, may receive and process signals from the sensors 70, the ECU 44, the transaxle 22, the TCM 68, the BCM 66, or a combination thereof to obtain data or information about the engine 16.

Any suitable device in the HEV 14 can provide information indicating the speed of the engine 16 to the controller 60. For example, a speed sensor 70 may provide the speed of the engine 16 to the controller 60. The speed sensor 70 can be an engine position sensor that produces a predetermined number of equally spaced pulses for each revolution of a crankshaft in the HEV 14. The VSC/PCM 65 can receive the spaced pulses from the speed sensor 70 to determine the speed of the engine 16 and transmit the speed to the controller 60. The speed of the engine 16 can be expressed in revolutions per minute (RPM) or any other suitable form.

Any suitable device in the HEV 14 can provide information indicating the speed "$\omega_{mot}$" of the electric motor 28 to the controller 60. In one example, the TCM 68 can provide the motor speed "$\omega_{mot}$" to the controller 60, which may be based on commands to the electric motor 28. In another example, the HEV 14 may include a resolver. The resolver senses position of a rotor in the electric motor 28 and generates a resolver signal having rotor position information embedded or encoded therein. The controller 60 and/or TCM 68 can receive the resolver signal to obtain various values (e.g., $L_d$, $L_q$, $R_s$ and $\lambda_{pm}$) and operating conditions ($V_d$, $V_q$, and $\omega$) of the electric motor 28. Based on the values and operating conditions of the electric motor 28, the controller 60 and/or TCM 68 can determine the speed "$\omega_{mot}$" of the electric motor 28.

Any suitable device in the HEV 14 can provide information to the controller 60 that indicates the torque "$\tau_{mot}$" that the electric motor 28 outputs to power transfer gear set 30. For example, the TCM 68 can determine the motor torque "$\tau_{mot}$" and transmit a signal embedded or encoded with the motor torque "$\tau_{mot}$" to the controller 60. The TCM 68 may determine the motor torque "$\tau_{mot}$" as being the commanded motor torque that the motor 28 is commanded to deliver.

Any suitable device in the HEV 14 can provide information indicating speed "$\omega_{gen}$" of the electric generator 26 to the controller 60. In one example, the TCM 68 can provide the generator speed "$\omega_{gen}$" to the controller 60 based on commands to the electric generator 26. Alternatively, a generator resolver (not shown) may sense position of the generator drive shaft 42 and generate a generator resolver signal having generator speed information embedded or encoded therein. The controller 60 and/or TCM 68 can obtain and process various values and operation conditions of the electric generator 26 from the generator resolver signal to determine the speed "$\omega_{gen}$" of the electric generator 26.

Any suitable device in the HEV 14 can provide information to the controller 60 that indicates the torque "$\tau_{gen}$" between the electric generator 26 and the generator drive shaft 42. For example, the TCM 68 can determine the generator torque "$\tau_{gen}$" and transmit a signal embedded or encoded with the generator torque "$\tau_{gen}$" to the controller 60. The TCM 68 may determine the generator torque "$\tau_{gen}$" as being the commanded generator torque that the electric generator 26 is commanded to deliver to generator drive shaft 42.

At least one of the sensors 70 of FIG. 1 may be a temperature sensor. The temperature sensor may be used to sense a temperature indicative of a temperature level of the engine 16. For example, the temperature sensor may sense a temperature of a cylinder head in the engine 16 and transmit a sensor signal with the temperature to the VSC/PCM 65 and/or the ECU 44. In another example, the temperature sensor may sense a temperature directly from engine coolant passing through a heater core in the HEV 14 to obtain the temperature level of the engine 16. The VSC/PCM 65 can process the sensor signal from the temperature sensor to determine the temperature level. For example, the VSC/PCM 65 may estimate or determine the temperature level of the engine 16 based on the temperature level of the cylinder head in the engine 16. The controller 60 can receive the temperature level from the VSC/PCM 65. In addition, the controller 60 may obtain other information from the VSC/PCM 65, such as an ambient temperature outside the HEV 14.

Figure 2:
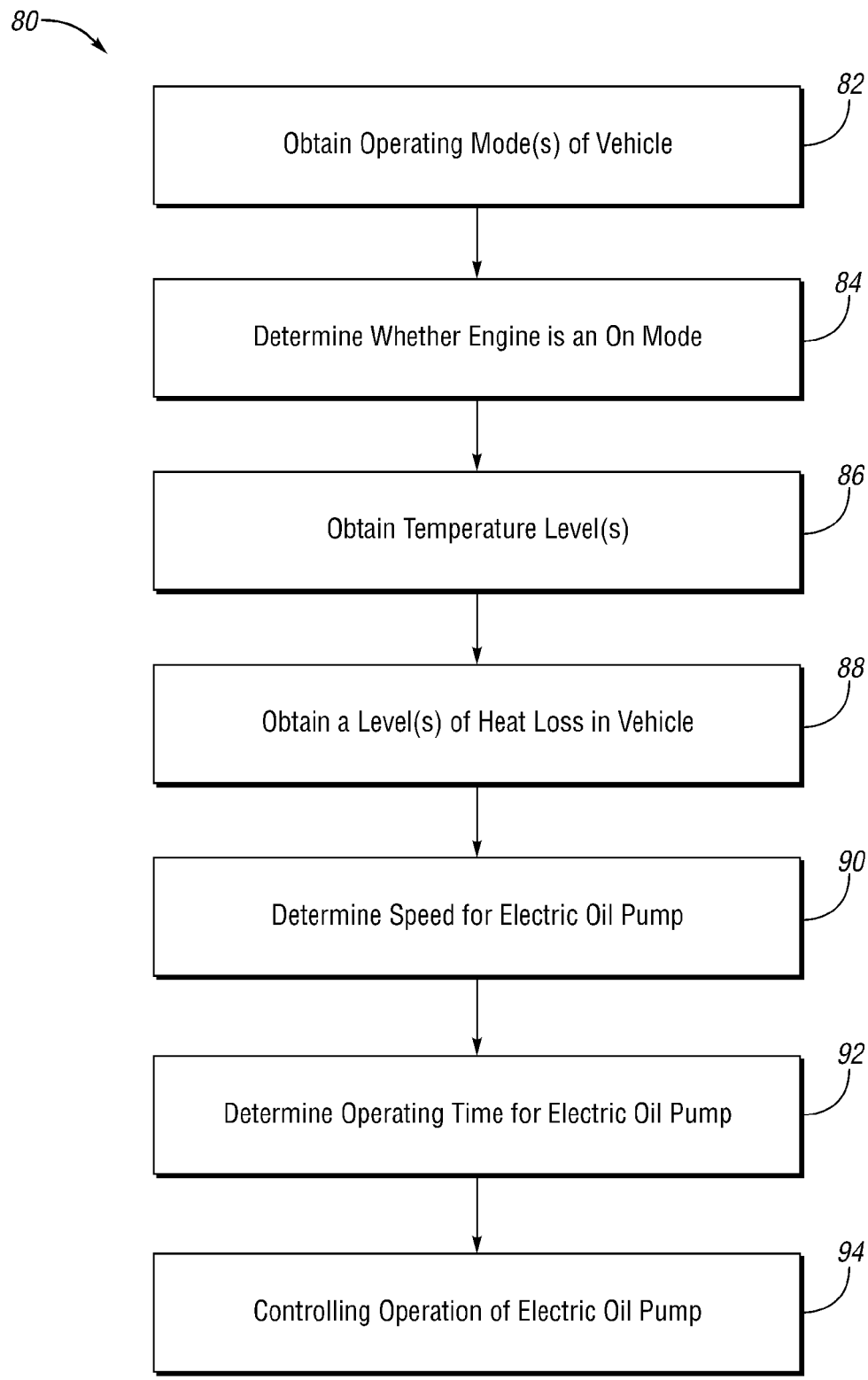
FIG. 2 is a flowchart diagram illustrating a method of controlling operation of the electric oil pump in the HEV in accordance with one embodiment.

With reference to FIG. 2, a flowchart diagram 80 is generally provided to illustrate steps of a method of controlling operation of the electric oil pump 12 in the HEV 14 in accordance with one embodiment. In addition to the steps shown in FIG. 2, a logic device or controller in the HEV 14 may be programmed with additional steps to provide additional functionality. Although the various steps shown in the flowchart diagram 80 appear to occur in a chronological sequence, at least some of the steps may occur in a different order, and some steps may be performed concurrently or not at all.

With reference to FIG. 2, the HEV 14 and its components illustrated in FIG. 1 are referenced throughout the discussion of the method to facilitate understanding of various aspects of the method. The method of controlling operation of the electric oil pump 12 in the HEV 14 may be implemented through a computer algorithm, machine executable code, or a software program programmed into a suitable programmable logic device(s) of the HEV 14, such as the controller 60, the hybrid control unit (HCU) 62, the VSC/PCM 65, the pump controller 64, other controller in the HEV 14, or a combination thereof.

At block 82 of flowchart diagram 80, one or more operating modes of the HEV 14 are obtained. The controller 60, which may include the HCU 62 in communication with the pump controller 64, may obtain the operating mode of the HEV 14. The operating mode of the HEV 14 may include an operating condition of the HEV 14, a previous operating mode of the HEV 14, whether the HEV 14 is operating in a sensitive mode, or a combination thereof. For example, the controller 60 may determine the operating condition of the HEV 14 based on whether the HEV 14 is currently operating in the electric drive mode either alone or in combination with the VSC/PCM 65. In addition, the controller 60 may obtain the previous operating mode of the HEV 14 based on data or information indicating the previous operating mode from the VSC/PCM 65 and/or the TCM 68.

The previous operating modes may be categorized as aggressive, moderate-aggressive, moderate, and passive based on the speed of the engine 16, motor speed $\omega_{mot}$, motor torque $\tau_{mot}$, generator speed $\omega_{gen}$, generator torque $\tau_{gen}$, or a combination thereof. An aggressive operating mode may indicate a previous drive cycle of the HEV 14 experiencing relatively high torques and low speeds. The moderate-aggressive operating mode may indicate a previous drive cycle of the HEV 14 experiencing relatively moderate torques and high speeds. The moderate operating mode may indicate a previous drive cycle of the HEV 14 experiencing moderate-to-low torques and moderate-to-low speeds. The passive operating mode may indicate a previous drive cycle of the HEV 14 experiencing relatively low torques and relatively low speeds.

With continuing reference to block 82, the controller 60 may determine whether the HEV 14 is operating in a sensitive mode. In the sensitive mode of the HEV 14, a passenger in the HEV 14 can substantially notice or experience noise, vibration, and harshness (NVH) from the electric oil pump 12. The controller 60 may determine whether the HEV 14 is operating in the sensitive mode based on various operating parameters of the HEV 14, such as the speed of the engine 16, the motor speed $\omega_{mot}$, and the generator speed $\omega_{gen}$. In addition, the sensitive mode may be based on a signal having PRNDL position information (i.e., gear shift selection information for park, reverse, neutral, drive, low-drive). For example, the controller 60 may determine a NVH level in the HEV 14 based on gear shift selection information either alone or in combination with the speed of the engine 16, the motor speed $\omega_{mot}$, and/or the generator speed $\omega_{gen}$. For example, the controller 60 may determine that the NVH level is greater when the HEV 14 is in the drive gear than when the HEV 14 is in a park or neutral mode. Furthermore, the controller 60 may determine the NVH level when the transaxle 22 is shifted into a forward mode and driven forward to accelerate through a range of gears. As the NVH level due to noise, vibration, and harshness from the engine 16, the generator 26, and the electric motor 28 increases, the noise, vibration, and harshness from the electric oil pump 12 becomes less noticeable by a passenger in the HEV 14.

At block 84 of flowchart diagram 80, it is determined whether the engine 16 in the HEV 14 is in an ON state. For example, the speed of the engine 16 may determine whether the engine 16 in the HEV 14 is in an ON state. Likewise, the engine 16 may be considered to be in the ON state when the speed of the engine 16 exceeds a predetermined speed threshold. Alternatively, a state of the engine 16 may be determined to determine whether the engine 16 in the HEV 14 is in the ON state. The controller 60 may determine whether the engine 16 in the HEV 14 is in an ON state based on signals from the ECU 44, the TCM 68, and/or the VSC/PCM 65.

At block 86, one or more temperature levels are obtained. Temperature levels may include the temperature level of the engine 16, a temperature of transaxle oil in the sump 54, a temperature of an electronic power converter in the HEV 14, power electric coolant, the ambient temperature outside the HEV 14, other temperature levels indicative of heat generated in the transaxle 22, or combination thereof. The electronic power converter in the HEV 14 may be an inverter that converts DC power from the battery 18 to AC power for operating the electric motor 28 and/or the electric generator 26. The controller 60, which may include the HCU 62 in communication with the pump controller 64, may obtain the temperature levels either alone or in combination with the VSC/PCM 65.

With continuing reference to block 86, temperature levels can be used to determine the speed for the electric oil pump 12 and/or how long the electric oil pump 12 is to operate at the speed. For example, the temperature levels may be directly proportional to the speed for the electric oil pump 12. Thus, the commanded speed for the electric oil pump 12 may increase as temperature levels increase. When temperature levels increase, a greater rate of cooling or removing heat from the transaxle oil via the heat exchanger 56 may be needed and, therefore, the controller 60 may increase the commanded speed for the electric oil pump 12. Likewise, the commanded speed for the electric oil pump 12 may decrease as temperature levels decrease. The commanded speed for the electric oil pump 12 may decrease to provide a lower rate of cooling and to conserve use of electric energy from the battery 18.

At block 88, one or more levels of power loss or heat loss in the HEV 14 is obtained. The controller 60, which may include the HCU 62 in communication with the pump controller 64, may obtain the levels of heat loss of the HEV 14 either alone or in combination with the VSC/PCM 65. For example, the controller 60 may calculate the power loss based on an estimated power loss in the electric motor 28, the electric generator 26, the electronic power converter in the HEV 14. The power loss of the motor 28 and electric generator 26 may be represented as $P_{loss}$.

At block 90, a speed for the electric oil pump 12 is determined. The speed that is determined for the electric oil pump 12 may be referenced as a commanded speed. Block 90 (shown in FIG. 2) may correspond to a set of steps of flowchart diagram 100 (shown in FIG. 3). The controller 60, which may include the HCU 62 in communication with the pump controller 64, may determine the speed for the electric oil pump 12 either alone or in combination with the VSC/PCM 65. The controller 60 may determine the speed for the electric oil pump 12 based on whether the engine 16 in the HEV 14 is in an ON state, one or more operating modes of the HEV 14, one or more temperature levels, one or more levels of power loss or heat loss in the HEV 14, or a combination thereof.

With continuing reference to block 90, the pump controller 64 may command the electric oil pump 12 to operate at a high speed when the HEV 14 experiences an aggressive operating mode including high torques and a relatively high ambient temperature outside the HEV 14. In another example, the pump controller 64 may command the electric oil pump 12 to operate at a moderate speed when the HEV 14 experiences a moderate-aggressive operating mode including moderate torques, high vehicle speeds, moderate power losses, and a relatively moderate ambient temperature outside the HEV 14. The moderate-aggressive operating mode may be determined based on actual drive-cycle data obtained during operation of the HEV 14. In another example, the pump controller 64 may command the electric oil pump 12 to operate at a low speed when the HEV 14 experiences a passive operating mode. The HEV 14 may experience the passive operating mode when the HEV 14 has low power losses and a relatively low temperature levels for a predetermined time. In another example, the pump controller 64 may command the electric oil pump 12 to operate at a low speed when the HEV 14 is able to operate continuously with moderate power losses over a predetermined time interval.

Referring again to block 90, the controller 60 may select or modify the commanded speed in an effort to optimize a balance between cooling and/or lubrication of the transaxle 22 and consuming electric power from the battery 18. For example, the controller 60 may determine the low speed of the electric oil pump 12 to be a commanded speed that achieves the balance between cooling and/or lubrication and consuming electric power.

Referring again to block 90, the speed for the electric oil pump 12 may be a function of a minimum flow rate needed for lubrication based on a previous operating mode of the HEV 14, a flow rate needed for cooling components within the transaxle 22, as well as a flow rate associated with a target NVH level of the electric oil pump 12 depending on operation of the HEV 14. For example, the controller 60 may determine to decrease the speed for the electric oil pump 12 when the HEV 14 is to operate in driving modes that are sensitive to radiated noise from the electric oil pump 12. Noise from the electric oil pump 12 increases as the speed of the electric oil pump 12 increases. Thus, the NVH level in the HEV 14 may be directly proportional to the speed of the electric oil pump 12. The commanded speed that the controller 60 determines may be based on a flow rate of transaxle oil required to provide lubrication to prevent significant damage or degradation to the transaxle 22.

With continuing reference to block 90, the controller 60 may determine the speed for the electric oil pump 12 based on time since last operation of either the mechanically-driven oil pump 46 or the electric oil pump 12. For example, the commanded speed for the electric oil pump 12 may be inversely proportional to the time since last cooling and/or lubrication of the transaxle 22. Thus, the controller 60 may decrease the commanded speed as the time since last operation of pumps 12, 46 increases because the need or desire for cooling and/or lubrication of the transaxle 22 may increase with longer lapses of time since the last operation of pumps 12, 46.

At block 92, a pump operating time for the electric oil pump 12 is determined. The pump operating time refers to how long the electric oil pump 12 is to operate. The controller 60, which may include the HCU 62 in communication with the pump controller 64, may determine the pump operating time. For example, the controller 60 may determine the pump operating time for the electric oil pump 12 based on the time duration of the sensitive mode of the HEV 14. In such an example, the controller 60 may determine the electric oil pump 12 to operate at a low speed during the sensitive mode of the HEV 14. After lapse of the pump operating time, the controller 60 may control the electric oil pump 12 to operate at a new commanded speed, such as a default speed for the electric oil pump 12.

At block 94, operation of the electric oil pump 12 is controlled. The pump controller 64 controls operation of the electric oil pump 12 including the speed of the electric oil pump 12. In addition, the pump controller 64 may control the electric oil pump 12 to operate at the commanded speed for the pump operating time.

As shown in FIG. 3, a flowchart diagram 100 is generally provided to illustrate steps of a method of controlling operation of the electric oil pump 12 in the HEV 14 in accordance with one embodiment. In addition to the steps shown in FIG. 3, a logic device or controller in the HEV 14 may be programmed with additional steps to provide additional functionality. Although the various steps shown in the flowchart diagram 100 appear to occur in a chronological sequence, at least some of the steps may occur in a different order, and some steps may be performed concurrently or not at all. Steps of flowchart diagram 100 can be used for one or more steps in flowchart diagram 80 (shown in FIG. 2). Likewise, steps in flowchart diagram 80 may be used for one or more steps in flowchart diagram 100 depending on the implementation of method of controlling operation of the electric oil pump 12.

With reference to FIG. 3, the HEV 14 and its components illustrated in FIG. 1 are referenced throughout the discussion of the method to facilitate understanding of various aspects of the method. The method of controlling operation of the electric oil pump 12 in the HEV 14 may be implemented through a computer algorithm, machine executable code, or a software program programmed into a suitable programmable logic device(s) of the HEV 14, such as the controller 60, the hybrid control unit (HCU), the VSC/PCM 65, 62, the pump controller 64, other controller in the HEV 14, or a combination thereof.

At decision block 102 of flowchart diagram 100, it is determined whether the HEV 14 is in an electric drive mode. The controller 60 may determine whether the HEV 14 is operating in the electric drive mode either alone or in combination with the VSC/PCM 65. For example, the controller 60 may determine whether the HEV 14 is operating in the electric drive mode based on an electric vehicle signal generated in the HCU 62. Furthermore, decision block 102 may include steps corresponding to block 82 of flowchart diagram 80. If the HEV 14 is not in the electric drive mode, then decision block 104 occurs. However, decision block 106 occurs if the HEV 14 is in the electric drive mode.

At decision block 104, it is determined whether the engine 16 in the HEV 14 is in an ON state. For example, the speed of the engine 16 may determine whether the engine 16 in the HEV 14 is in the ON state. Likewise, the engine 16 may be considered to be in the ON state when the speed of the engine 16 exceeds a predetermined speed threshold. Alternatively, a state of the engine 16 may be determined to determine whether the engine 16 in the HEV 14 is in the ON state. The controller 60 may determine whether the engine 16 in the HEV 14 is in an ON state based on signals from the ECU 44, the TCM 68, and/or the VSC/PCM 65. If the engine 16 in the HEV 14 is in the ON state, then block 108 occurs. However, decision block 110 occurs if the engine 16 in the HEV 14 is not in the ON state, such as when the engine 16 is in an OFF state.

At decision block 106, it is determined whether relatively high temperatures exist in the transaxle 22. The controller 60, which may include the HCU 62 in communication with the pump controller 64, may determine whether relatively high temperatures exist in the transaxle 22 either alone or in combination with the VSC/PCM 65. The controller 60 may determine whether relatively high temperatures exist in the transaxle 22 based on the temperature level of the engine 16, a temperature of transaxle oil in the sump 54, a temperature of an electronic power converter in the HEV 14, power electric coolant, other temperature levels indicative of heat generated in the transaxle 22, or combination thereof. For example, relatively high temperatures may exist in the transaxle 22 when a temperature of the transaxle oil exceeds a temperature between eighty and one-hundred and eighty degrees Fahrenheit (80-180° F.). If relatively high temperatures do not exist in the transaxle 22, then decision block 112 occurs. However if relatively high temperatures exist in the transaxle 22, then block 114 occurs and the electric oil pump 12 is controlled to operate at a high speed.

At block 108, the electric oil pump 12 is controlled to an OFF state. The controller 60 may switch the electric oil pump 12 to the OFF state or maintain the electric oil pump 12 in the OFF state at block 108. For example, the controller 60 may control the electric oil pump 12 to a speed of zero or a predetermined idle speed where the electric oil pump 12 uses a relatively low amount of energy from the HEV 14.

At decision block 110, it is determined whether relatively high temperatures exist in the transaxle 22. Like decision block 106, the controller 60 may determine whether relatively high temperatures exist in the transaxle 22 either alone or in combination with the VSC/PCM 65 based on one or more temperature indicators. If relatively high temperatures exist in the transaxle 22, then block 114 occurs and the electric oil pump 12 is controlled to operate at a high speed. However, decision block 116 occurs if relatively high temperatures do not exist in the transaxle 22.

At decision block 112, it is determined whether the previous operating state of the HEV 14 was aggressive. The controller 60 may determine whether the previous operating mode of the HEV 14 was aggressive either alone or in combination with the VSC/PCM 65. The controller 60 may determine whether the previous operating mode was aggressive based on the speed of the engine 16, motor speed $\omega_{mot}$, motor torque $\tau_{mot}$, generator speed $\omega_{gen}$, generator torque $\tau_{gen}$, the ambient temperature outside the HEV 14, or a combination thereof. For example, an aggressive operating mode may indicate a previous drive cycle of the HEV 14 experiencing relatively high motor and/or generator torques ($\tau_{mot}$, $\tau_{gen}$). In another example, relatively high torques in the HEV 14 and a relatively high ambient temperature outside the HEV 14 may define an aggressive operating mode of the HEV 14. If the previous operating mode of the HEV 14 was aggressive, then decision block 122 occurs. However, decision block 124 occurs if the previous operating mode of the HEV 14 was not aggressive.

At block 114, the electric oil pump 12 is controlled to operate at a high speed. The pump controller 64 can control operation of the electric oil pump 12 including the speed of the electric oil pump 12. For example, the controller 60, which may include the HCU 62 in communication with the pump controller 64, may transmit a signal with the commanded speed for the electric oil pump 12 to the pump controller 64. The pump controller 64 receives the signal to operate the electric oil pump 12 at the commanded speed. For example, the commanded speed may be fifteen liters per minute (15 L/min) to operate the electric oil pump 12 at the high speed. In another example, the high speed of the electric oil pump 12 may be the maximum speed of the electric oil pump 12. Alternatively, the high speed of the electric oil pump 12 may be a speed within a range of high speeds stored in memory of the controller 60. The high speed may be selected from the range of high speeds based on whether relatively high temperatures exist in the transaxle 22 and/or whether the HEV 14 is in the electric drive mode.

At decision block 116, it is determined whether the previous operating mode of the HEV 14 was aggressive. The functionality of decision block 116 corresponds to the functionality of decision block 112. If the previous operating mode of the HEV 14 was aggressive, then block 118 occurs. However, if the previous operating mode of the HEV 14 was not aggressive then block 108 occurs.

At block 118, a pump operating time for the electric oil pump 12 is set to a predetermined minimum time. The predetermined minimum time corresponds to time needed to cool and/or lubricate components in the HEV 14 (e.g., the power-split gearing 24, the electric motor 28, the electric generator 26, etc.) to a level consistent with the previous operating mode of the HEV 14 being aggressive and the mechanically-driven oil pump 46 in an OFF state. The controller 60, which may include the HCU 62 in communication with the pump controller 64, may determine the pump operating time based on the predetermined minimum time. The controller 60 may calculate the predetermined minimum time based on various parameters used to determine the previous operating mode of the HEV 14 as well as temperature levels of the engine 16, the transaxle oil in the sump 54, the electronic power converter in the HEV 14, the power electric coolant, other temperature levels indicative of heat generated in the transaxle 22, or combination thereof. The predetermined minimum time may be stored in memory of the controller 60.

At block 120, the electric oil pump 12 is controlled to operate at a low speed for the pump operating time. The pump controller 64 can control the speed of the electric oil pump 12 as well as the operating time of the electric oil pump 12. The controller 60, which may include the HCU 62 in communication with the pump controller 64, may transmit a signal with the commanded speed and pump operating time to the pump controller 64. The controller 60 may determine the low speed or low commanded speed for the electric oil pump 12 based on determining a speed of the electric oil pump 12 that achieves a predetermined balance or ratio of energy used for cooling and/or lubrication of the transaxle 22 and energy from the battery 18 used to operate electric devices in the HEV 14. The pump controller 64 receives the signal to operate the electric oil pump 12 at the commanded speed for the operating time.

At decision block 122, it is determined whether the HEV 14 is operating in a sensitive mode. The controller 60 may determine whether the HEV 14 is operating in the sensitive mode based on various operating parameters of the HEV 14, such as the speed of the engine 16, the motor speed $\omega_{mot}$, and the generator speed $\omega_{gen}$ as well as other parameters in the HEV 14 that indicate noise, vibration, and harshness (NVH) that a passenger in the HEV 14 may substantially notice or experience. If the HEV 14 is operating in the sensitive mode, then block 120 occurs and the electric oil pump 12 is controlled to operate at a low speed. However, if the HEV 14 is not operating in the sensitive mode then block 126 occurs and the electric oil pump 12 is controlled to operate at a moderate speed.

At decision block 124, it is determined whether the transaxle oil in the sump 54 has a temperature below a predetermined threshold temperature. For example, the predetermined threshold temperature may be may be a temperature between zero and thirty degrees Fahrenheit (0-30° F.). The temperature of the transaxle oil in the sump 54 may be referred to as a transaxle oil temperature (TOT). The controller 60 may obtain the indication of TOT either alone or in combination with the TCM 68 and/or the VSC/PCM 65. For example, the sump 54 may include a sensor to sense a temperature of the transaxle oil flowing in the transaxle 22 to obtain the indication of TOT. The TOT may be obtained directly from transaxle oil in the sump 54 for the controller 60 to obtain the indication of TOT from the sensor in the sump 54. If the transaxle oil in the sump 54 has a temperature below the predetermined threshold temperature, then block 126 occurs. However, decision block 122 occurs if the transaxle oil in the sump 54 does not have a temperature below the predetermined threshold temperature.

At block 126, the electric oil pump 12 is controlled to operate at a moderate speed. The pump controller 64 can control operation of the electric oil pump 12 including the speed of the electric oil pump 12. For example, the controller 60, which may include the HCU 62 in communication with the pump controller 64, may transmit a signal with the commanded speed for the electric oil pump 12 to the pump controller 64. The pump controller 64 receives the signal to operate the electric oil pump 12 at the commanded speed. For example, the commanded speed may be eight liters per minute (8 L/min) to operate the electric oil pump 12 at the moderate speed. In another example, the moderate speed of the electric oil pump 12 may be an intermediate speed of the electric oil pump 12. Alternatively, the moderate speed of the electric oil pump 12 may be a speed within a range of moderates speeds stored in memory of the controller 60. The moderate speed may be determined based on a NVH level in the HEV 14, a TOT in the HEV 14, a previous operating mode of the HEV 14, or combination thereof.

At block 128, temperatures, an operating mode, and losses may be obtained. The controller 60 may obtain one or more of these parameters through calculation of other parameters or by receiving a signal embedded or encoded with such information. The temperatures, the operating mode, and losses may be obtained to repeatedly control operation of the electric oil pump 12 in the HEV 14 and to ensure proper lubrication and/or cooling in the transaxle 22 as the HEV 14 experiences difference situations and/or circumstances.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling operation of an electric oil pump in a hybrid electric vehicle (HEV) with an engine and a transaxle with an electric motor, the method comprising:
    controlling the electric oil pump to operate at a commanded speed when the engine is in an off state; and
    determining an operating condition of the HEV and determining the commanded speed based on the operating condition of the HEV;
    wherein the commanded speed is further based on a temperature of at least one of the engine and the transaxle.

2. The method of claim 1 further including determining the operating condition of the HEV based on whether the HEV is operating in an electric drive mode.

3. The method of claim 1 further including determining the operating condition of the HEV based on a noise, vibration, and harshness (NVH) level in the HEV associated with a speed of at least one of the engine and the electric motor;
    controlling the electric oil pump to operate at a first commanded speed when the speed of at least one of the engine and the electric motor is less than a threshold speed value corresponding to a sensitive operating mode; and
    controlling the electric oil pump to operate at a second commanded speed when the speed of at least one of the engine and the electric motor is greater than the threshold speed value corresponding to the sensitive operating mode;
    wherein the second commanded speed is greater than the first commanded speed.

4. The method of claim 1 further including determining an electric oil pump operating time based on the operating condition of the HEV and controlling the electric oil pump to operate at the commanded speed for the determined time.

5. A method of controlling operation of an electric oil pump in a hybrid electric vehicle (HEV) with an engine and a transaxle with an electric motor, the method comprising:
    controlling the electric oil pump to operate at a commanded speed when the engine is in an off state; and
    determining a prior operating mode of the HEV and determining the commanded speed based on the prior operating mode;
    wherein the commanded speed is further based on a temperature of at least one of the engine and the transaxle.

6. The method of claim 5 further including determining a pump operating time based on the prior operating mode of the HEV and controlling the electric oil pump to operate at the commanded speed for the pump operating time.

7. The method of claim 5 further including determining the prior operating mode based on at least one of a prior speed of the HEV and a prior torque output in the HEV; and
    controlling the electric oil pump to operate at a low commanded speed when the prior torque output in the HEV is greater than a threshold torque value, corresponding to an aggressive operating mode.

8. A method of controlling operation of an electric oil pump in a hybrid electric vehicle (HEV) with an engine and a transaxle with an electric motor, the method comprising:
    controlling the electric oil pump to operate at a commanded speed when the engine is in an off state; and
    calculating a power loss in the HEV and determining the commanded speed based on the power loss;

wherein the commanded speed is further based on a temperature of at least one of the engine and the transaxle.

9. The method of claim 8 wherein the power loss is calculated based on an estimated power loss from at least one of a motor in the transaxle, a generator in the transaxle, and an electronic power converter in the HEV.

10. The method of claim 8 further including determining a pump operating time based on the power loss in the HEV and controlling the electric oil pump to operate at the commanded speed for the operating time.

* * * * *